United States Patent
Frink et al.

(10) Patent No.: US 7,121,069 B2
(45) Date of Patent: Oct. 17, 2006

(54) NET BLANKET FOR USE AS A HOLDING HARNESS FOR URINE COLLECTING DEVICES FOR HORSES

(75) Inventors: Martin Frink, Wedemark (DE); Zoltan Magosi, Mezoehegyes (HU)

(73) Assignee: Solvay Pharmaceuticals GmbH, Hannover (DE)

( * ) Notice: Subject to any disclaimer, the term of this patent is extended or adjusted under 35 U.S.C. 154(b) by 57 days.

(21) Appl. No.: 10/740,838

(22) Filed: Dec. 22, 2003

(65) Prior Publication Data

US 2004/0194436 A1 Oct. 7, 2004

Related U.S. Application Data

(60) Provisional application No. 60/446,542, filed on Feb. 12, 2003.

(30) Foreign Application Priority Data

Dec. 23, 2002 (EP) .................................. 02028895

(51) Int. Cl.
*B68C 5/00* (2006.01)
(52) U.S. Cl. ........................................ 54/79.1; 54/80.4
(58) Field of Classification Search ................. 54/79.1, 54/79.2, 79.3, 79.4, 80.4; 119/850, 838, 119/858, 854, 867, 868, 869; D30/145, 161
See application file for complete search history.

(56) References Cited

U.S. PATENT DOCUMENTS

| 478,708 | A | * | 7/1892 | Osmer ........................ 54/80.4 |
|---|---|---|---|---|
| 1,171,508 | A | * | 2/1916 | Erdmann .................... 54/80.4 |
| 1,218,829 | A | * | 3/1917 | Bean .......................... 54/80.4 |
| 1,677,839 | A | * | 7/1928 | Montels ...................... 54/80.4 |
| 1,703,660 | A |   | 2/1929 | Davis et al. |
| 2,110,465 | A | * | 3/1938 | Little .......................... 54/80.4 |
| 3,036,553 | A |   | 5/1962 | Gandier |
| 3,090,356 | A | * | 5/1963 | Andrisani ................... 119/868 |
| 4,290,386 | A | * | 9/1981 | Eiriksson .................... 119/868 |
| 4,893,587 | A |   | 1/1990 | Bailey, Jr. |
| 5,738,047 | A | * | 4/1998 | McNamara ................. 119/869 |
| 5,839,395 | A | * | 11/1998 | Kelley et al. ............... 119/850 |
| 5,937,795 | A | * | 8/1999 | Raphael ...................... 119/869 |
| D423,737 | S | * | 4/2000 | MacGuinness ............ D30/145 |
| 6,318,054 | B1 |   | 11/2001 | Gatto |
| 6,408,604 | B1 | * | 6/2002 | Schneider ................... 54/79.1 |
| 6,662,756 | B1 | * | 12/2003 | Paterson ..................... 119/869 |

(Continued)

FOREIGN PATENT DOCUMENTS

DE 19937840 A1 2/2001

(Continued)

OTHER PUBLICATIONS

Search Report mailed Jan. 14, 2004.

*Primary Examiner*—Teri Pham Luu
*Assistant Examiner*—Elizabeth Shaw
(74) *Attorney, Agent, or Firm*—Crowell & Moring LLP

(57) ABSTRACT

A net blanket for a horse for use as an easy-to-handle holding harness for flexible and easily replaceable attachment of a urine collecting device to the horse, which net blanket comprises a net (1) for covering the predominant part of the horse's rump, the net blanket at the sides reaching down to at most approximately the lower rump line and being closed or closable in front of the breast of the horse (2). The net blanket according to the invention is useful to flexibly suspend a urine collecting device for obtaining a natural mixture of conjugated estrogens from pregnant mares' urine.

23 Claims, 3 Drawing Sheets

U.S. PATENT DOCUMENTS 6,666,171 B1 12/2003 Frink
2002/0134319 A1 9/2002 Frink

FOREIGN PATENT DOCUMENTS

| | | |
|---|---|---|
| FR | 925362 | 9/1947 |
| FR | 2193545 | 2/1974 |
| HU | 201273 | 8/2002 |
| WO | WO-0072667 A1 | 12/2000 |
| WO | WO-0245488 A1 | 6/2002 |

\* cited by examiner

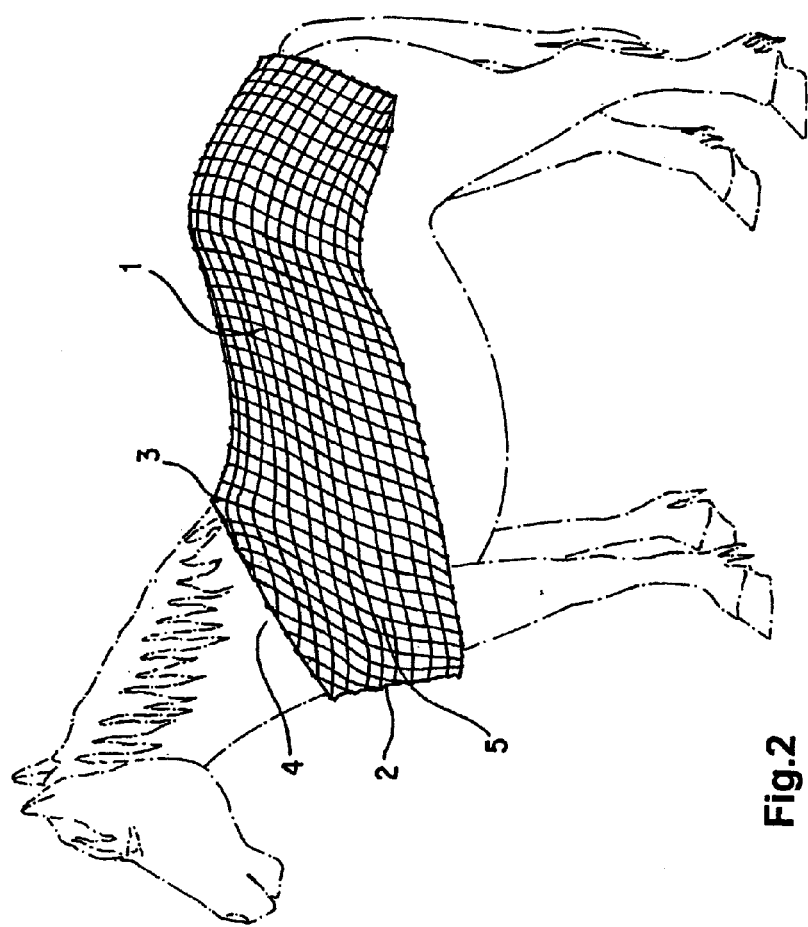

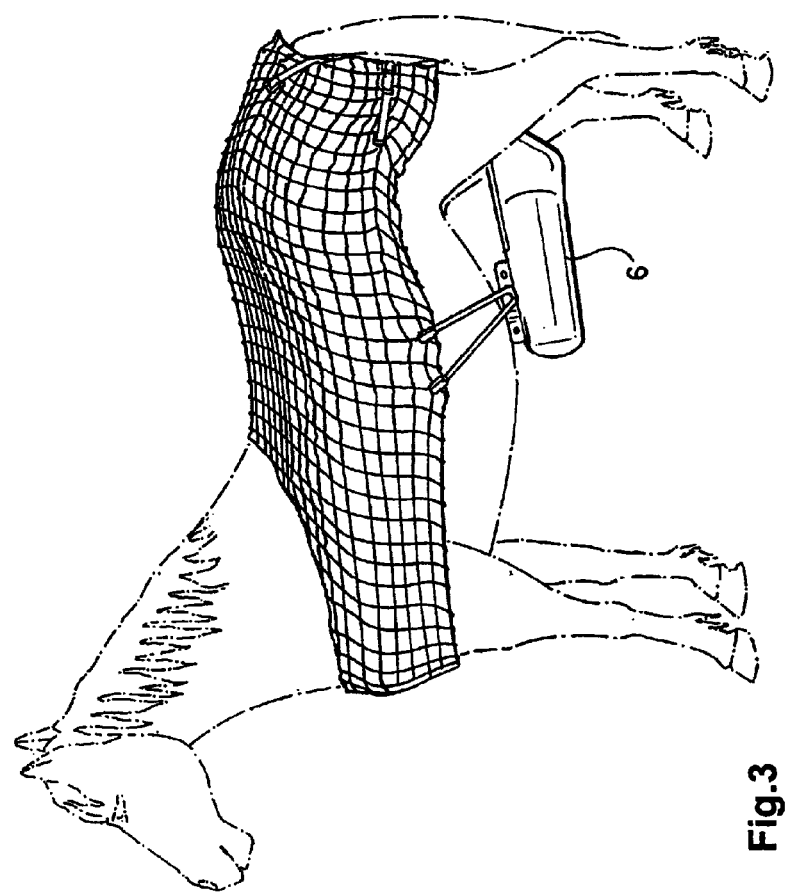

NET BLANKET FOR USE AS A HOLDING HARNESS FOR URINE COLLECTING DEVICES FOR HORSES

BACKGROUND OF THE INVENTION

The present invention relates to a net blanket for horses as an easy-to-handle holding harness for the flexible and easily replaceable fastening of a urine collecting device to horses. The net blanket according to the invention as a holding harness is in this case intended in particular for flexibly suspending urine collecting devices for obtaining a natural mixture of conjugated estrogens from pregnant mares' urine.

Estrogens are used in medicine for hormone replacement therapy. In particular, estrogen mixtures are used for the treatment and prophylaxis of the disorders of the climacteric period which occur in women after natural or artificial menopause. In this case, natural mixtures of conjugated estrogens (CO) such as are found in the urine of pregnant mares (PMU=pregnant mares' urine) have proved particularly effective and readily compatible.

The collection of the urine is therefore a significant partial step in obtaining hormones, and requires suitable devices which permit the urine to be collected in a practicable manner which is compatible with the animal. Such devices are usually composed of a holding harness and a urine collecting device. In particular, the entire device should be easy to wear and be compatible with the normal behaviour and requirements of mobility and rest of the horse. Furthermore, the device should however also permit flexible (easy attachment and removal or replacement of the collecting device) collection of the urine which is effected as purely as possible (no faecal contamination) and in a manner protecting the hormones.

The holding harness to which the urine collecting device is fastened should be able to be adapted easily to the individual dimensions of the horse and fix the urine collecting device adequately in the desired position on the horse. Once the urine collecting device has been attached, if at all possible no readjustment, or only infrequent to occasional readjustment, should be necessary, and—while also allowing the horse as great a freedom of movement as possible—urine collection which is as loss-free as possible should be ensured.

A holding harness of this type with urine collecting device has already been described in published US patent application no. US 2002/0134319 A1 (=WO 00/72667). Furthermore, international patent application no. WO 02/45488 (=U.S. Ser. No. 10/453,888) describes a holding harness with a urine collecting device wherein in particular the urine collecting device can be handled comfortably and be kept hygienically clean due to a detachable head part. The holding harness itself should furthermore hamper the horses as little as possible, be easy to handle and easy to care for and in particular permit flexible fastening of the urine collecting device which can be adapted quickly to the dimensions of the individual horse.

SUMMARY OF THE INVENTION

It was therefore an object of the invention to provide an improved holding harness for flexible and easily replaceable attachment of a urine collecting device to a horse.

Another object of the invention was to provide an optimised, inexpensive holding harness for attaching a urine collecting device to a horse.

A further object of the invention was to provide a holding harness for attaching a urine collecting device to a horse which meets high requirements with regard to comfort of wearing for the horses and with regard to practicable usability on an industrial scale.

An additional object of the invention was to provide a holding harness for attaching a urine collecting device to a horse which would be very easy to handle and easy to care for.

Yet another object of the invention was to provide an inexpensive holding harness for attaching a urine collecting device to a horse which would be not prone to needing repair.

It was also an object of the invention to provide a holding harness which permits flexible fastening of a urine collecting device to a horse and which can be adapted quickly to the dimensions of the individual horse.

These and other objects are achieved in accordance with the present invention by providing a net blanket for use as a holding harness for flexibly and replaceably attaching a urine collecting device to a horse, said net blanket comprising a net which covers the predominant part of the horse's rump and at the sides reaches down to at most approximately the lower rump line of the horse, and is closed or closable in front of the breast of the horse, wherein said net is suitable for the detachably suspending a urine collecting device in a fixed position beneath the horse's belly.

The invention therefore proposes a net blanket for horses for use as a holding harness for the flexible and replaceable fastening of a urine collecting device to horses, in particular mares, which is characterised in that it is a net covering the predominant part of the horse's rump which at the sides reaches down to at most approximately the lower rump line and is closed or can be closed in front of the breast of the horse, and the net is suitable for the position-fixing, yet detachable suspension of a urine collecting device which can be worn beneath the horse's belly.

Although published US patent application no. US 2002/0134319 A1 already describes a large-mesh net covering approximately the loin and croup region, together with a conventional basic harness consisting of straps for horses, which likewise is suitable for fastening a urine collecting device, in a departure therefrom, according to the present invention exclusively a net blanket is provided as a holding harness. This consists only of a net covering the predominant part of the rump, which net is already self-supporting and can be used for fastening a urine collecting device without an additional costly strap system.

BRIEF DESCRIPTION OF THE DRAWINGS

The invention will be described in further detail hereinafter with reference to illustrative preferred embodiments shown in the accompanying drawing figures in which:

FIG. 2 is a side view of a horse with a net blanket placed thereon as a holding harness for attaching a urine collecting device showing the net (1), the breast (2) of the horse, the position of the withers (3), the net edge in the neck region (4), and the side part (5); and FIG. 3 is a side view of a horse with a net blanket placed thereon as a holding harness and with a urine collecting device attached thereto.

DETAILED DESCRIPTION OF PREFERRED EMBODIMENTS

Figure 1:
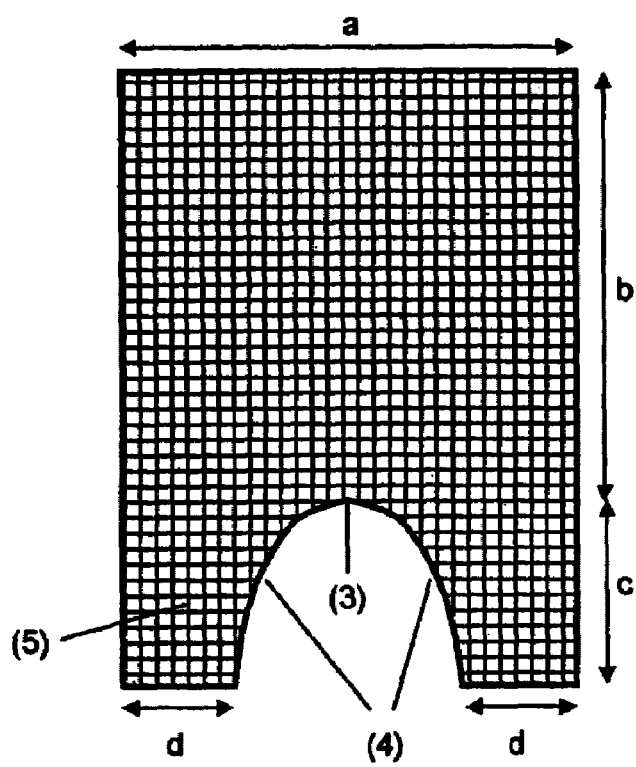
FIG. 1 is a diagrammatic representation of a net blanket according to the invention for a horse as a holding harness for attaching a urine collecting device viewed from above, the net blanket being shown opened in the breast region (along the width d) of the side parts (5) in which (3) indicates the position of the withers, (4) the net edge in the neck region, (5) the side part; and in which a) indicates the width and b) the length of the net section covering the horse's rump, and c) indicates the length and d) the width of a side part (5).

The use of a net blanket for horses as a holding harness within the scope of the present invention has for example the advantage that this net offers a large number of ways of fastening for any type of urine collecting device and thus these collecting devices can be fastened to the horse and adjusted in an ideal manner with great flexibility. This net is therefore very advantageous for optimum suspension and fixing of urine collecting devices in particular for mares, since in this case, as loss-free collection of the mare's urine as possible can only be ensured if the urine collecting device is permanently and perfectly fixed and adjusted.

Using a net covering the predominant part of the horse's rump for suspending urine collecting devices, and the possibilities of fixing and adjusting these urine collecting devices which this yields, means that a significant improvement in urine collection is achieved. Furthermore, the net—in contrast, for example, to a horse blanket—largely prevents any sweating by the horse. There is then no fear of adversely affecting the obtention of estrogen due to secretion of sweat when using the net blanket according to the invention as the exclusive holding harness.

The net blanket according to the invention for horses as a holding harness for fastening a urine collecting device, compared with the holding harnesses known from the prior art, which always comprise at least a basic harness consisting of straps or consist exclusively of straps, is self-supporting and does not require any additional straps to fasten and fix it to the horse. The stability of the net and the fixing thereof to the horse is obtained by the suspension and the weight of the urine collecting device. The net blanket according to the invention as a holding harness is very easy to put on the horse compared with a holding harness consisting of straps and owing to its low weight and its large contact surface is considerably more pleasant for the horse to wear.

Furthermore, the net blanket according to the invention as a holding harness is very easy to care for, since the care—in contrast to a holding harness consisting of straps—does not require costly oiling and cleaning of the straps and buckles, but the net can simply be washed. This also ensures greater hygiene. In addition, the holding harness according to the invention is considerably less prone to needing repair and also, since it consists only of a coherent net, is easier to handle and to store. The optimised holding harness according to the invention in the form of the net blanket is furthermore very inexpensive to produce, use and care for compared with the holding harnesses of the prior art.

The net blanket according to the invention for horses as a holding harness for the fastening of a urine collecting device consists of a net covering the predominant part of the horse's rump which at the sides reaches down to at most approximately the lower rump line and is closed or can be closed in front of the breast of the horse (2), the net being designed such that it is in the form of a cape with neck opening and thus adopts the form of a horse blanket usually used in horse-keeping. Preferably the net—as indicated diagrammatically in FIG. 1—has a generally U-shaped form with a very broad base, the arms of the U, which are referred to below as side parts (5), being meant to extend around the neck and the shoulders of the horse and to be joined together reversibly detachably or permanently at its breast.

In one particular embodiment, the section of the net covering the horse's rump—the base of the U-shape—has a quadrilateral, in particular a rectangular, form of a width a) and a length b) of this neck section. The ratio of the width a) to the length b) may be between 2:1 and 2:3. In a preferred embodiment, the ratio of the width a) to the length b) lies in a range between 3:2 and 1:1, so that the section of the net covering the horse's rump has a rectangular to square form.

Starting from the position of the withers (3) of the horse, the side parts (5) already mentioned above, which become narrower toward the front of a length c) and a width d) adjoin the section of the net covering the horse's rump. The length c) of these side parts is preferably in the range between one third to one half of the length b) of the net section covering the horse's rump. The width d) of each side part, measured at the front, narrowest end d) of the side part, is preferably approximately in the range between one third up to one fifth of the entire width a) of the net section covering the horse's rump. The ends of the two side parts (5) of width d) are joined together reversibly detachably or permanently in front of the breast of the horse (2). The tapering of the side parts (5) in the neck region of the horse may be continuous and rectilinear; in a preferred embodiment the inner edge of each side part is arcuate in shape.

The following particulars of the dimensions of the net are intended to explain the configuration of this aspect of the invention only by way of example. It goes without saying that the person skilled in the art can vary these dimensions at will and adapt them to individual circumstances, requirements or other boundary conditions when carrying out the invention at a given location, such as for example adaptation to the individually differing size of individual horses and to the individually differing build of individual horses.

The sides of the net section covering the horse's rump of the holding harness according to the invention may generally be of the order of approximately 100 to 170 cm for the width a) and of the order of approximately 80 to 150 cm for the length b). A width a) in the range of approximately 120 to 150 cm, preferably in the range of 130 to 140 cm, has proved expedient. Advantageously, the length b) has a size in the range of approximately 90 to 140 cm, for small-framed horses preferably a size in the range of approximately 100 to 110 cm and for large-framed horses preferably in the range of approximately 120 to 130 cm. The length c) of the side parts (5) which become narrower towards the front may generally be of the order of between about 30 and 90 cm; a length c) in the range of approximately 45 to 65 cm has proved particularly advantageous. The width d) of each side part may generally be of the order of about 10 to 50 cm; a width d) in the range of 20 to 40 cm has proved particularly advantageous.

The lateral ends of the net may hang down at most as far as the lower rump line; in another exemplary embodiment, it is sufficient if the lateral ends of the net extend down so far that a minimum of approximately half the rump is covered. The lateral ends of the net may however also extend as far as any position between the aforementioned two extremes. The ends of the net hanging down may optionally be additionally held by one or more loosely attached belts which pass from one side to the other beneath the horse. The net blanket according to the invention for horses as a holding harness for fastening a urine collecting device is in the form of a cape with neck opening, the cape being designed such that it is or can be closed in front of the breast of the horse (2).

In one preferred embodiment, the net blanket according to the invention is continuous and hence permanently closed in front of the breast of the horse (2)—the breast part of the net—so that the net is pulled over the horse's head like a pullover. In this embodiment, the front edges of the net side parts (5) of width d) are permanently joined together in front of the breast of the horse, for example by sewing the ends securely together. In another preferred embodiment of the net blanket according to the invention, the net can be closed in front of the breast of the horse (2), i.e. it can be reversibly opened and closed again.

The side parts (5) of the net covering the shoulder region of the horse are closed in front of the breast of the horse (2) preferably via one or more connecting elements of adjustable length, such as strips, hook-and-pile fasteners, buckles, quick-action belts or expanders, or by another conventional type of closure for horse blankets. The ends of the net side parts (5) of width d) are joined together reversibly by these connecting elements. By adjusting the length of the connecting elements, the net can thus be adapted individually also to horses of differing build and breast width.

The net may be made of any materials compatible with the horse, such as synthetic fibers of widely varying nature, in particular e.g. of polyamide fiber materials such as for example nylon, of polyacrylonitrile fiber materials or of polyester fiber materials, but optionally also of leather, hemp, jute, flax or cotton or of mixtures of the aforementioned materials. The strength of the net material should be sufficient to withstand even relatively long-term stress in practice.

The net edges in advantageous, preferred embodiments of the net will be made reinforced. To this end, the net edges may for example be oversewn, stitched or bonded with further materials, e.g. woven fabrics, knitted fabrics or non-woven fabrics. Furthermore, it is recommend to treat the net at the edges such that fraying of the net cords is prevented; for example, nets made of nylon fibers can be heat-treated, in order to prevent the risk of fraying by slightly melting the fibers.

The net blanket according to the invention comprises a net with mesh holes which preferably are of square basic form, but also may have a slightly rectangular form. The following particulars of the dimensions of the net mesh holes are intended to explain the configuration of this aspect of the invention only by way of example. It goes without saying that the person skilled in the art can vary these dimensions at will and adapt them to the individual circumstances, requirements or other boundary conditions when carrying out the invention at a given location.

The size of the net mesh holes is given below by means of the internal width of the individual mesh holes, the shortest distance between two opposing net cords within a mesh unit, measured from the inside to the inside of the net cords, being determined. In a preferred embodiment of the net blanket according to the invention as a holding harness, the net is a large-mesh net, the mesh holes of which have a minimum internal width of 15 mm. The internal width of the mesh holes of the large-mesh net may generally be in the range of approximately 15 to 100 mm; an internal width in the range of approximately 20 to 70 mm, in particular in the range of approximately 30 to 50 mm, has proved particularly expedient, an internal width of 40 to 45 mm being regarded as particularly preferable.

The cross-sectional diameter (thickness) of the net cords depends greatly on the selected materials. Furthermore, the cross-sectional diameter of the net cords is correlated with the mesh size: the greater the internal width of the mesh holes, the stronger must the net cords be, and the smaller the internal width of the mesh holes, the thinner the net cords can also be. The cross-sectional diameter (thickness) of the cords of the net may generally be in the range of approximately 2 to 12 mm, in particular in the range of approximately 3 to 8 mm; the use of net cords with a cross-sectional diameter in the range of approximately 4 to 6 mm, in particular of approximately 5 mm, has proved particularly advantageous.

In order to protect individual parts of the horse's body, the net blanket according to the invention as a holding harness may furthermore have padding of different thicknesses, depending on the part of the body. Padding of the net may be desirable in particular for the front breast region (2), in the region of the withers (3) and optionally of the back, and also in the region on the side breast wall of the horse. Conventional materials may be used for the padding; for example, conventional felt material, leather, synthetic or natural skins, but also modern fleece materials are suitable, which can each be used in different thicknesses and are fastened to the net for example by stitching or detachable fastening elements, such as for example strips, belts or hook-and-pile fasteners. However, also for example pads filled with watted fibers, which are fastened to the corresponding positions on the net, may be used.

In a preferred configuration of the invention, the net has padding in front of the breast of the horse (2). If the net is continuously closed in front of the breast of the horse, such padding may for example be in the form of a flat piece of leather or a thin, stuffed pad, which may be connected detachably or securely to the net, and span the entire front breast region. If the net can be reversibly opened and closed again in front of the breast of the horse (2), the padding may take place either independently of the closure mechanism or be integrated into the connecting elements serving for closure.

In a further preferred embodiment, the net has padding in the region of the withers (3) which can optionally be adjusted with respect to its position and thus is individually adaptable to each horse. In an exemplary embodiment, the net may have in the region of the withers a plush blanket of soft synthetic or natural materials which can be reversibly fastened for example by hook-and-pile fasteners to the net at various positions.

In a preferred embodiment, the padding is effected by means of continuous leather strips which are securely connected to the net for example by stitching and which optionally may also additionally be padded underneath with felt or comparable fabrics. In one embodiment, the leather padding extends around the front breast (2) (shoulder) approximately horizontally on both sides of the horse (in the region of the side parts (5) of the net) in each case to at most approximately the centre of the horse's belly.

In a further embodiment, leather padding, starting from the back in the region of the saddle position, extends on both sides of the horse up to the lateral ends of the net; optionally the pieces of leather padding may also extend beyond the net edges and be joined together reversibly beneath the breast, for example by means of a connecting element of adjustable length. In a preferred embodiment, the net has both the leather padding extending around the front breast and the leather padding extending in the region of the saddle position, the paddings optionally being able to be securely connected together, for example by seams or rivets.

Furthermore, the opening in the net blanket according to the invention may be adjustable in size in the region of the withers (3) by means of additional connecting elements of adjustable length, which can be fastened to the two side parts (5), and thus are adaptable to the individual horse's dimensions in the region of the withers and around the neck.

In a further embodiment, the net blanket according to the invention as a holding harness is distinguished in that the edges of the net in the neck region (4) are shaped by annular padding. For this, for example, the edges of the net may be surrounded by soft padding materials such as polyester wadding, which for fixing are wrapped around with covering materials and stitched. Preferably the net margins in the neck region (4) are surrounded with wide leather strips which cover the net edge.

Furthermore, for additional fixing of the net blanket as a holding harness, the net may be equipped with a crupper attached in the region of the croup and extending as far as the tail head with a tail loop surrounding the tail head.

The fastening of a possible urine collecting device (6) to the net blanket according to the invention as a holding harness, in the form of a net covering the predominant part of the horse's rump is illustrated by way of example in FIG. 3. The fastening itself may be effected in many different ways, for example by means of cords, expanders, belts or the like. In particular fastening by expanders or by flat-lying nylon straps with plug connectors of plastics material has proved expedient for practical use. Commercially available expanders with hooks may be used; however, expanders or rubber cables with carbine hooks which lie flat, e.g. made of plastics material or of high-grade steel, are more advantageous owing to the lesser risk of injury to the horse.

In addition to the advantages already described above in conjunction with the explanation of the net blanket according to the invention as a holding harness for the flexible suspension of a urine collecting device, the invention furthermore offers still further advantages:

The net blanket according to the invention, comprising a net (1), for horses as a holding harness for fastening a urine collecting device is universally usable and owing to its design, in particular its one-part nature, easy to handle. Any design of urine collecting device can be suspended therefrom flexibly and with good fixing in position. The attachment or removal of the net blanket as a holding harness corresponds to the placing on or removal of a conventional horse blanket and can be carried out quickly in a fluent movement, so that there is scarcely any risk of unsettling the horse by unintentional hectic handling and the resulting dangers.

The net can be placed on or removed in a very short space of time; in the case of a net which is closed in front of the breast, the net is pulled over the horse's head, whereas in the case of nets which are to be opened in front of the breast merely the corresponding connecting elements have to be closed after placing on or opened before removing. This possibility of closure furthermore ensures individual adaptation of the net to the differing builds of individual horses.

The net blanket as a holding harness can be worn long-term with a urine collecting device fastened to it. Thus, for example, 24-hour urine collection is possible, provided that the urine collecting device is appropriately looked after and kept clean, the urine collecting device being readily removable from the horse or exchangeable for emptying and cleaning, which takes place at least three times a day. Owing to the net blanket as a holding harness, the horse can move freely even with the urine collecting device. Owing to the high flexibility and freedom of movement which is ensured for the horse, when using the net blanket according to the invention as a holding harness with urine collecting device it is not necessary to tether the horse in a narrow stall or box, but the horses can graze at any time. Likewise, foals can suckle independently at any time without difficulty even on mares with an attached urine collecting device.

On the other hand, if necessary the entire structure comprising the net blanket according to the invention as a holding harness together with the urine collecting device can be removed very easily and quickly and reattached again later, e.g. during the day for grazing, if provision is made for only night-time collection of urine. Furthermore, the net blanket for horses, consisting of a net, as a holding harness is extremely inexpensive, extremely easy to care for and easy to manufacture industrially. These nets may, like corresponding horse blankets, be manufactured and provided for example in several different sizes. Thus, in contrast to a conventional holding harness consisting of straps, no costly individual adjustment of a large number of belt buckles is necessary to adapt the net blanket as a holding harness to the individual dimensions of each horse.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A net blanket for use as a holding harness for flexibly and replaceably attaching a urine collecting device to a horse, said net blanket consisting of a net which covers the predominant part of the horse's rump and at the sides reaches down to at most approximately the lower rump line of the horse,
    which net is continuous and closed in front of the breast of the horse and has an opening for the neck of the horse,
    which net is a large mesh net having mesh holes with a minimum internal width of 15 mm and which net is suitable for detachably suspending a urine collecting device in a fixed position beneath the horse's belly.

2. A net blanket according to claim 1, which is configured for attaching a urine collecting device to a pregnant mare.

3. A net blanket according to claim 1, wherein said mesh holes have an internal width in the range from about 15 to about 100 mm.

4. A net blanket according to claim 1, wherein said mesh holes have an internal width in the range from about 20 to about 70 mm.

5. A net blanket according to claim 1, wherein said mesh holes have an internal width in the range from about 30 to about 50 mm.

6. A net blanket according to claim 1, wherein said net is composed of net cords having a cross-sectional diameter in the range from about 2 to about 12 mm.

7. A net blanket according to claim 6, wherein said net cords have a cross-sectional diameter in the range from about 3 to about 8 mm.

8. A net blanket according to claim 1, wherein said net is made of nylon material.

9. A net blanket according to claim 1, wherein said net has reinforced edges.

10. A net blanket according to claim 1, wherein the opening of the net for the neck of the horse is adjustable in size in the region of the withers of the horse.

11. A net blanket for use as a holding harness for flexibly and replaceably attaching a urine collecting device to a horse, said net blanket consisting of a net which covers the predominant part of the horse's rump and at the sides reaches down to at most approximately the lower rump line of the horse,
which net is continuous and closed in front of the breast of the horse and has an opening for the neck of the horse,
which net is a large mesh net having mesh holes with a minimum internal width of 15 mm and which net is suitable for detachably suspending a urine collecting device beneath the horse's belly, wherein a urine collecting device is attached to the net in a fixed position beneath the horse's belly.

12. A net blanket for use as a holding harness for flexibly and replaceable attaching a urine collecting device to a horse, said net blanket consisting of a net which covers the predominant part of the horse's rump and at the sides reaches down to at most approximately the lower rump line of the horse,
which net is continuous and closed in front of the breast of the horse and has an opening for the neck of the horse,
which net is a large-mesh net having mesh holes with a minimum internal width of 15 mm,
which net is suitable for detachably suspending a urine collecting device in a fixed position beneath the horse's belly, and
which net has one or more paddings.

13. A net blanket according to claim 12, wherein the padding is located in front of the breast of the horse.

14. A net blanket according to claim 12, wherein the padding is located in the region of the withers of the horse.

15. A net blanket according to claim 14, wherein said padding can be adjusted with respect to its position and is individually adaptable to the horse.

16. A net blanket according to claim 12, wherein edges of the net in the neck region of the horse are shaped by annular padding.

17. A net blanket according to claim 12, which is configured for attaching a urine collecting device to a pregnant mare.

18. A net blanket according to claim 12, wherein the opening of the net for the neck of the horse is adjustable in size in the region of the withers of the horse.

19. A net blanket for use as a holding harness for flexibly and replaceable attaching a urine collecting device to a horse, said net blanket consisting of a net which covers the predominant part of the horse's rump and at the sides reaches down to at most approximately the lower rump line of the horse,
which net is continuous and closed in front of the breast of the horse and has an opening for the neck of the horse,
which net is a large-mesh net having mesh holes with a minimum internal width of 15 mm,
which net is suitable for detachably suspending a urine collecting device in a fixed position beneath the horse's belly, and
which net has one or more paddings,
wherein a urine collecting device is attached to the net in a fixed position beneath the horse's belly.

20. A net blanket according to claim 19, wherein the padding is located in front of the breast of the horse.

21. A net blanket according to claim 19, wherein the padding is located in the region of the withers of the horse.

22. A net blanket according to claim 21, wherein said padding can be adjusted with respect to its position and is individually adaptable to the horse.

23. A net blanket according to claim 19, wherein edges of the net in the neck region of the horse are shaped by annular padding.

* * * * *